United States Patent [19]
Arnold et al.

[11] Patent Number: 4,849,991
[45] Date of Patent: Jul. 18, 1989

[54] METHOD AND CIRCUITRY FOR DETERMINING SYMBOL TIMING FOR TIME DIVISION MULTIPLE ACCESS RADIO SYSTEMS

[75] Inventors: Hamilton W. Arnold, Holmdel; Nelson R. Sollenberger, East Millstone, both of N.J.

[73] Assignee: Bell Communications Research, Inc., Livingston, N.J.

[21] Appl. No.: 213,083

[22] Filed: Jun. 29, 1988

[51] Int. Cl.[4] .............................................. H03D 3/02
[52] U.S. Cl. ....................................... 375/84; 375/106
[58] Field of Search .................... 375/56, 84, 106, 110; 329/50, 104, 105, 110, 126, 128; 370/100, 104, 92, 93; 455/33, 38; 379/59, 60, 63

[56] References Cited

U.S. PATENT DOCUMENTS 4,715,047 12/1987 Hambley ................................ 375/84
4,746,872 5/1988 Yamagata ............................ 329/109
4,757,266 7/1988 Yoshida et al. ........................ 375/39

OTHER PUBLICATIONS

"Block Demodulation for Short Radio Packet", Electronics and Communications in Japan, vol. 67-B, No. 5, Junji Namiki, 1984.

Primary Examiner—Benedict V. Safourek
Attorney, Agent, or Firm—James W. Falk; Stephen M. Gurey

[57] ABSTRACT

In order to correctly demodulate a received sequential burst of symbols in a Time Division Multiple Access (TDMA) radio system, proper symbol timing is necessary. A method and circuitry for estimating symbol timing is disclosed in which the IF radio signal is sampled and digitized at a sampling rate which is sixteen times the symbol rate. The digitized samples are processed to obtain phase values. A one symbol delay is introduced and differential phase values derived, a differential phase value being derived for each of the sixteen sampling times per symbol. The differential phase values are compared with expected differential phase values and the absolute differences are accumulated for each sampling time over substantially the entire burst. The symbol timing is selected to be the particular one-of-the-sixteen sampling times that results in the minimum sum of differences.

21 Claims, 12 Drawing Sheets

DIGITAL DEMODULATOR BLOCK DIAGRAM

DIGITAL DEMODULATOR FRONT END

OPTIMIZED IMPLEMENTATION

PHASE RECOVERY

DIFFERENTIAL PHASE CONSTELLATION

SYMBOL TIMING BURST MEMORY

SYMBOL TIMING RECOVERY

FREQUENCY OFFSET ESTIMATOR

DURING THE LAST SYMBOL OF THE BURST → CLEAR RAM

BLOCK COHERENT DEMODULATION

COHERENT CARRIER RECOVERY
1 OF 2

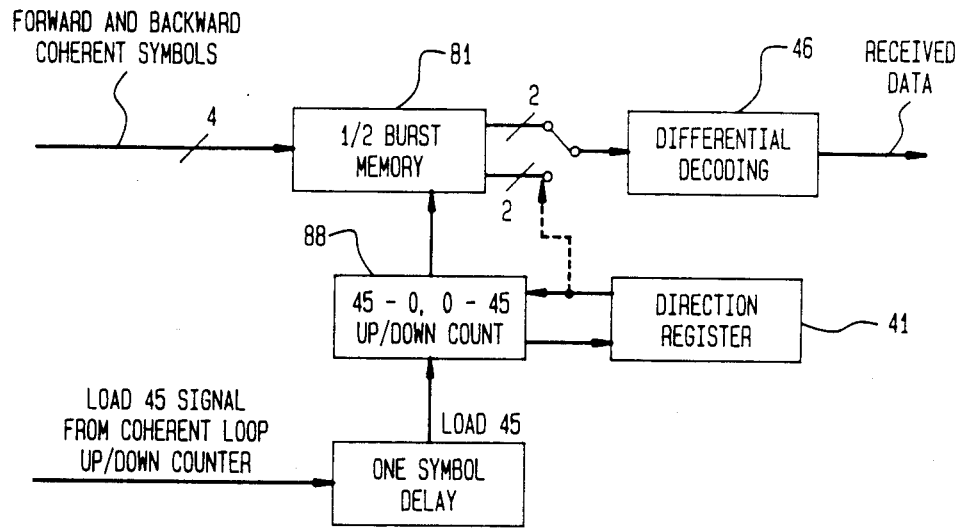

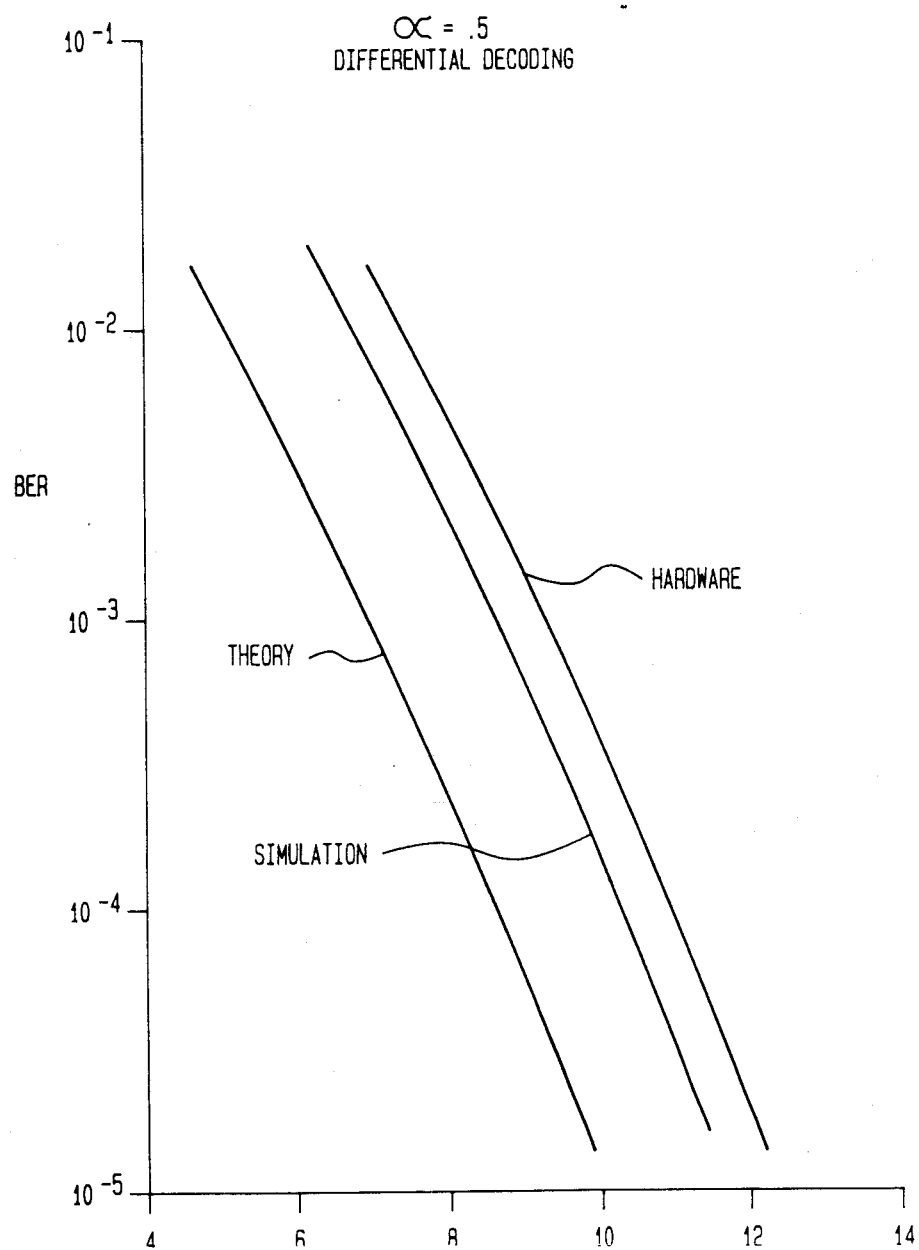

BLOCK DIFFERENTIAL BER

METHOD AND CIRCUITRY FOR DETERMINING SYMBOL TIMING FOR TIME DIVISION MULTIPLE ACCESS RADIO SYSTEMS

RELATED APPLICATION

This application is related to J.C-I Chuang-N.R. Sollenberger copending application Ser. No. 213,082, filed concurrently on June 29, 1988, for "METHOD AND CIRCUITRY FOR CARRIER RECOVERY FOR TIME DIVISION MULTIPLE ACCESS RADIO SYSTEMS" and assigned to the present assignee.

FIELD OF THE INVENTION

The invention relates to the processing of radio signal transmissions for time division multiple access radio systems, and more particularly to determining symbol timing of radio signals consisting of sequential bursts of symbols utilizing completely digitized techniques.

BACKGROUND OF THE INVENTION

Time division multiple access (TCMA) systems are being developed for digital mobile and portable radio systems. These TDMA systems can greatly simplify radio hardware and can accommodate variable user data rates.

However, such systems become inefficient when there is a large number of overhead symbols required to synchronize symbol timing. The large number of symbols will often result in a significant reduction in spectral efficiency, nullifying the advantages obtained with the use of TDMA.

The present invention uses a new and elegant digital signal processing technique for obtaining symbol timing. The technique of the invention is completely digital resulting in circuitry that is greatly simplified and which lends itself to low-power VLSI implementation.

The inventive technique allows for the demodulation of isolated bursts on the order of 100 symbols in length with no overhead penalty for symbol timing, frequency estimation or coherent carrier recovery.

The invention eliminates the requirement for multiplication in the processing of the data.

Frequency offset estimation is uniquely fed forward to the carrier recovery phase of the processing.

Differential detection is also available within the scope of the invention, thus providing the unique opportunity to switch to the differential mode if the receiver is used in a fast-fading condition where coherent phase recovery becomes more difficult.

DISCUSSION OF RELATED ART

In a recent article entitled: Block Demodulation for Short Radio Packet by Junji Namiki, *Electronics and Communications in Japan*, Vol. 67-B, No. 5, 1984, a block demodulation method is described using coherent detection techniques similar to the present invention. While the described method minimizes the mean square phase error by feeding forward some parameters estimated by stored block data, it does so only on average, and the instantaneous error may be high.

With the present invention, however, higher order derivatives of the phase may be tracked with the use of two first-order feed back loops, and the transient high error period is completely eliminated.

For the Namiki method to be capable of tracking the higher order derivatives, a significantly more complex system would result than that described in the present invention.

In addition, the Namiki process requires symbol timing derived from an additional source, such as a preamble to the burst transmissions.

In the present inventive method, no such requirement is necessary.

SUMMARY OF THE INVENTION

The invention pertains to the digital processing of digital phase modulated radio signal transmissions comprising sequential bursts of symbols for TDMA systems. The signal bursts are generally about 100 symbols in length.

Symbol timing and frequency offset estimation are necessary for demodulating the signals. The methodology for accomplishing these estimates is generally complex and not easily accomplished. The invention provides a simplified digital process for obtaining symbol timing and frequency offset estimates without using multiplication. The method converts the radio signal from a modulated sinusoid into phase values.

First, the IF signal is digitized at a sampling rate which is a multiple of the symbol rate by at least a factor of four, but preferably by a factor of sixteen. This digitized signal is processed to obtain in-phase and in-quadrature signals, which are then utilized as addresses for an arc-tan look-up table wherein phase values are obtained. Working with these phase values, the processing does not require multiplication but only additive and subtractive techniques for obtaining the symbol timing estimate. Having converted the signal to phase values, a one symbol delay is introduced and the difference is taken.

It is the higher rate of sampling at the multiple of the symbol rate which ensures that the selected sample for demodulation is closest to the desired sampling instant. With a multiple of sixteen times, the maximum timing error is reduced to only 1/32 of a symbol period. A sampling time is selected resulting in a minimum average of differential phase values from amongst a set of expected phase values over the entire burst.

The frequency offset estimate is obtained by averaging differential phase value less expected differential phase values per symbol over the entire burst. After obtaining the phase values, they are stored awaiting the estimation of the symbol timing and frequency offset. These stored values are then demodulated.

The demodulation can be achieved by two different processes. Differential detection is available when the receiver is used in a fast-fading condition. Coherent phase recovery can also be utilized.

It is an object of this invention to provide a new and elegant digital signal processing technique for obtaining symbol timing for a TDMA system.

It is another object of the invention to provide an improved TDMA system whose circuitry can be implemented by VLSI techniques, giving rise to portable, compact hardware and low-power operation.

These and other objects of the invention will be better understood and will become more apparent with reference to the subsequent detailed description considered in conjunction with the accompanying drawings.

BRIEF DESCRIPTION OF THE DRAWINGS

FIG. 8 depicts a schematic diagram for the reordering of RAM memory for the demodulated burst as illustrated in FIG. 1;

FIG. 9 illustrates a graph of performance results for the invention of FIG. 1, as compared to simulated and theoretical results with respect to coherent demodulation.

DETAILED DESCRIPTION OF THE INVENTION

Generally speaking, the invention features new coherent burst demodulation circuitry for a Time Division Multiple Access (TDMA) radio system, TDMA hardware is useful for portable and mobile radio systems because of its capability to accommodate variable user data rates.

One of the drawbacks of previous TDMA systems was their inefficiency in their ability to synchronize symbol timing and to recover carrier phase in burst-mode operation.

The invention has developed a simplified digital process of obtaining a symbol timing estimate, and for block coherent demodulation of the burst. The simplified process can be easily accomplished with standard, off-the-shelf components that can be further refined to provide low-power, VLSI circuitry. The invention achieves this result without sacrificing good performance. An additional benefit of the new digital system is the unique block processing which recovers demodulation parameters with a minimum of overhead.

For purposes of brevity, like elements will have the same designation throughout the description.

Figure 1:
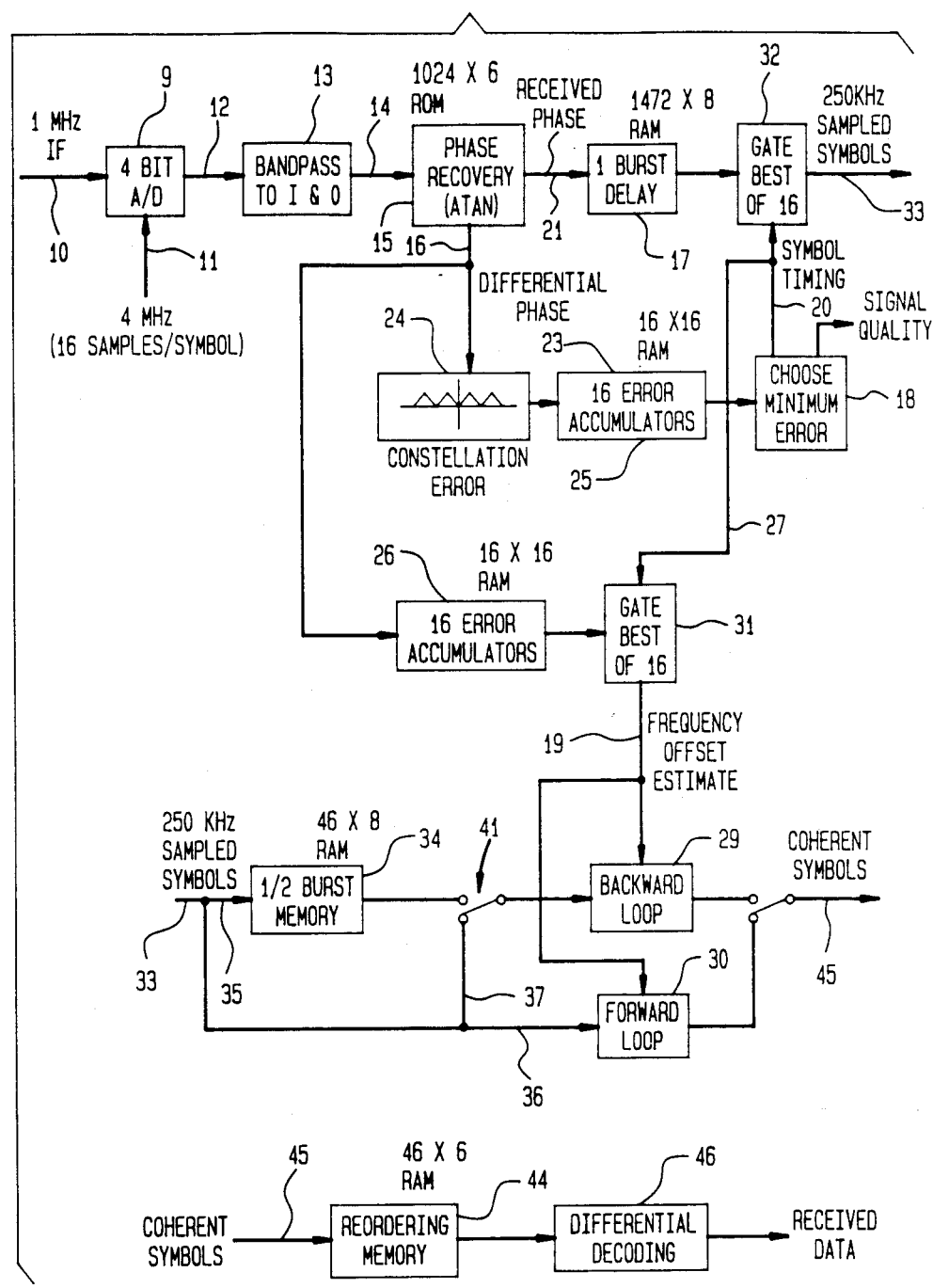
FIG. 1 is a block diagram of the demodulating system of this invention.

The inventive process which is shown as a flow chart, in block diagram, is depicted in FIG. 1. The process was implemented using general purpose TTL, memory chips and special purpose chips, such as the 4-bit, flash A/D converter 9. A 1 MHz IF signal 10 is digitized by the A/D converter 9. The A/D converter 9 is clocked at a 4 MHz rate 11, which provides a sampling rate of 16 samples per symbol. Each burst being processed comprises about 92 to 100 symbols. The symbol rate is approximately 250 KHz, such that the clock provides a sampling rate that is sixteen times that of the symbol rate. The increased sampling rate, as will be further explained hereinafter, provides for selection of a sample closest to the desired sampling instant which has the smallest timing error.

Bursts arrive in known time slots with a few symbols of uncertainty in position.

After digitizing the 1 MHz IF signal, the digital signal 12 is translated to baseband and low pass filtered to obtain in-phase (I) and in-quadrature (Q) signals, as shown by block 13.

The in-phase (I) and in-quadrature (Q) signals 14 are then used to address a ROM containing a table of arc-tangent values in order to recover phase, as illustrated by block 15. The signal is translated into phase from the cartesian samples.

Next, a differential phase 16 is derived, and used to estimate both symbol timing and frequency offset. A symbol timing circuit is used to choose the best of sixteen possible sample points per symbol (block 18) to perform demodulation, after a one burst delay (block 17).

The differential phase 16 is obtained by delaying the recovered phase by sixteen samples, i.e., one symbol, and subtracting the delayed signal from the current signal.

Figure 3:
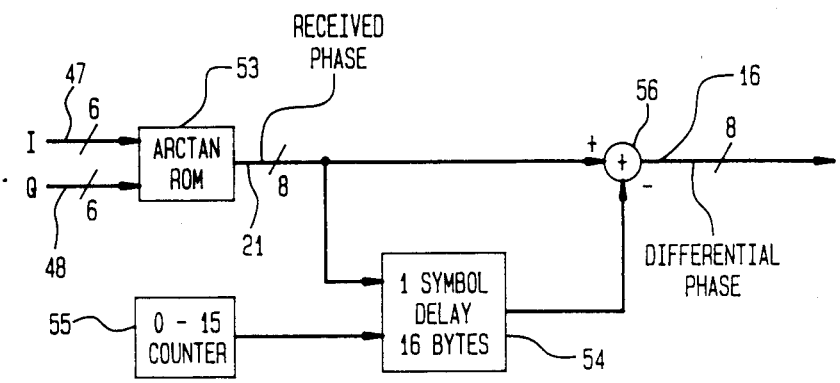
FIG. 3 shows the phase recovery circuitry for the inventive system of FIG. 1.
Figure 3A:
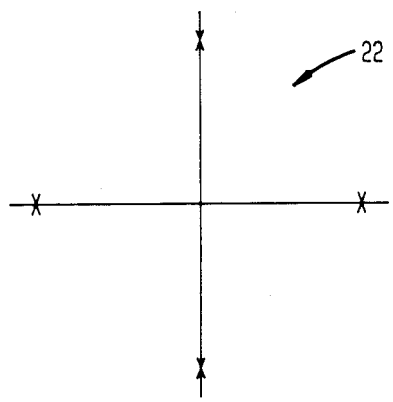
FIG. 3A depicts the differential phase constellation for the circuit of FIG. 3.

Differential phase 16 is used in the symbol timing 20 and frequency offset estimate 19 because the differential phase is clustered around one of the four possible constellation points (0, 90, 180 and 270 degrees), as shown in FIG. 3A, while received phase 21 is not locked in a particular constellation point until carrier recovery is achieved.

As will be explained in more detail hereinafter, when the two most significant bits are removed from the eight bit differential phase, the phase is rotated into the first quadrant (arrow 22 in FIG. 3A). This is equivalent to the removal of modulation in a conventional timing recovery or carrier recovery loop.

The symbol timing estimator 18 chooses the differential phase sample that results in the minimum deviation from the constellation points. One of the sixteen samples per symbol is selected for detection based on differential phase error magnitude from the constellation points (block 24) accumulated over the entire burst (block 25).

The frequency offset estimate 19 averages differential phase increment per symbol over the entire burst. This estimate also uses sixteen accumulations (block 26). The symbol timing estimator 18 chooses one (line 27) for the frequency offset estimate corresponding to the selected sampling point. This estimate is fed forward via gate 31 to modified first-order carrier-recovery loops 29 and 30, respectively.

After symbol timing and frequency offset are estimated, the stored (delayed) received phase 17 at the desire sampling instant is gated (block 32) to the input of the carrier recovery circuitry (line 33).

Figure 7:
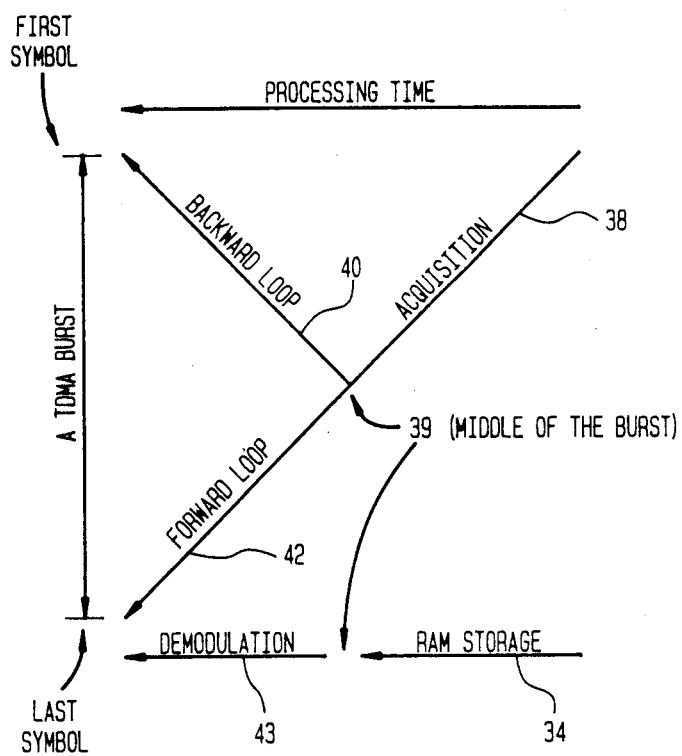
FIG. 7 illustrates a flow diagram for the block coherent recovery process as shown in FIG. 1.

For coherent demodulation, a unique process is utilized which is best explained with additional reference to the flow diagram of the process, depicted in FIG. 7.

As aforementioned, the stored received phase 17 is gated form storage (line 33) and fed to a one-half burst memory 34, a forward phase-lock loop 30 and a backward phase lock loop 29 via lines 35, 36 and 37, respectively.

As loops 29 and 30 track and acquire the first half portion of carrier phase (line 38 of FIG. 7), they lock at a common mid-point 39, as shown.

At this mid-point, the first half portion of carrier phase stored in the one-half burst memory 34 is fed to the backward loop 29 (arrow 40 of FIG. 7) via switch 41, in a reverse order of its reception into the one-half burst memory 34, as shown in FIG. 1.

The received phase (line 33 of FIG. 1, and line 38 of FIG. 7) which is equivalent to the second half portion of the burst after mid-point 39 is, or continues to be, fed to forward loop 30 (arrow 42 of FIG. 7).

Loop 29 simultaneously demodulates the stored first half portion of the carrier phase in reverse order of reception, while loop 30 demodulates the second half portion of the burst in its proper, forward order, as per arrow 43 in FIG. 7.

After both first and second half portions of the burst are demodulated, loop 29 and 30, the demodulated symbols are fed to a reordering memory 44 via line 45.

Differential decoding is performed after the demodulated symbols are reordered to remove phase ambiguity (block 46).

Except for the first symbol which is required for differential decoding, the inventive process and circuitry coherently demodulate a whole burst of symbols from a source with unknown carrier phase, whereby it is uniquely evident that the carrier recovery time does not reduce spectral efficiency in this TDMA system.

This process of coherent demodulation is not concerned with initiating demodulation at the edges of the burst, where the uncertainty of position can introduce noise. By starting the demodulation process in the middle of the burst, and then spreading outwardly in both directions to the ends of the burst, the exact position of the edges of the signal need not be determined.

A further advantage of the system is realized with the use of simple, first-order loops 29 and 30, respectively, which acquire lock more rapidly than often utilized second-order loops.

Now referring to FIGS. 2 and 2A, a more detailed explanation will be given for the front-end circuitry (elements 10 through 13) of FIG. 1. Other elements will be subsequently explained in more detail hereinafter, with reference to subsequent FIGS. 3 through 8.

To digitize the signal, a 1 MHz IF signal 10 is fed to a low resolution, e.g., 4-bit, A/D converter 9, which is clocked (line 11) at 4 MHz.

By using a final IF frequency four times the symbol rate of 250 KHz, and a sampling rate of sixteen times the symbol rate (4 MHz), several major goals are achieved:

1. The time resolution is adequate to demodulate one of the 16 samples per symbol directly without time or hardware overhead to phase-lock the sampling clock to the symbols or interpolate between samples. If the sample closest to the desired sampling instant is chosen for demodulation, the maximum timing error is only 1/32 of a symbol period, which introduces very little degradation when receiving signals with spectral roll-off of one half or greater.

2. Since the reference phase for the final IF mixer increases by 90 degrees per sample, the cosine and sine functions required by the final mixing for I (in-phase) and Q (quadrature) signals 47 and 48, respectively, become the sequences (1, 0, −1, 0) and (0, 1, 0, −1) respectively. Final mixing to baseband can thus be performed by a few binary additions.

For a symbol rate of 250 KBaud (500 Kbs), the final IF is 1 MHz and sampling is performed at 4 MHz. Low-pass filters 49 and 50, respectively (FIG. 2) are required after the mixers 51 and 52 to suppress the double-frequency component. Any DC component from the A/D converter 9 will be at one quarter of the sampling rate, and is also easily suppressed. By placing in the Z-plane a double-zero at (−1,0) and two single-zeroes at (0,1) and (0,−1), both the double-frequency and DC components are suppressed, and the resulting filter coefficients are (1,2,2,2,1). The filters are easily implemented with a few adders. The low-pass filters also suppress additive noise and quantization noise; therefore, the effective resolution of the signal is higher than 4 bits.

The baseband I and Q received signals 47 and 48, respectively, are converted to an 8 bit phase angle 21 (FIG. 3) by an arc-tangent ROM look-up table 53, shown in FIG. 3. The I and Q samples are represented by 6 bit numbers without loss of resolution. By taking the absolute value of I and Q, they are reduced to 5 bit numbers. The arc-tangent can then be performed for the first quadrant using a 1K×8 ROM. The sign bits are used to translate the output of the ROM 53 into the proper quadrant. By performing symbol timing and coherent recovery in angles, no multiplications are required, only additions. Using one-symbol delay, the differential phase 16 between two consecutive symbols is obtained. The delay is implemented using a RAM 54 and a counter 55 which modulo addresses the RAM 54 over 16 addresses performing a read before write at each address. The delayed signal is subtracted from the current signal by adder 56.

The two most significant bits of the differential phase can be used for differential detection after rotating 45 degrees while the remaining 6 bits, which represent differential phase error from constellation points, are used to estimate symbol timing and frequency offset. Differential phase 16 is used in the estimation because the received differential phase 21 is clustered around one of the 4 possible constellation points (0, 90, 180 and 270 degrees), as shown in FIG. 3, while the received phase is not locked to a particular constellation point until carrier recovery is achieved. It is important to note that by removing the two most significant bits, the phase is rotated into the first quadrant (arrow 22). This is equivalent to the removal of modulation in a conventional timing recovery or carrier recovery loop.

The symbol timing estimator chooses the sample that results in the minimum deviation from the constellation points. The decision is made by block estimation of the majority of the burst ignoring the edges to reduce errors from noise. Differential phase is also used to estimate frequency offset between a transmitter and a receiver, because the phase increment per symbol can be obtained from the phase deviation from the constellation points, as previously mentioned.

Figure 2:
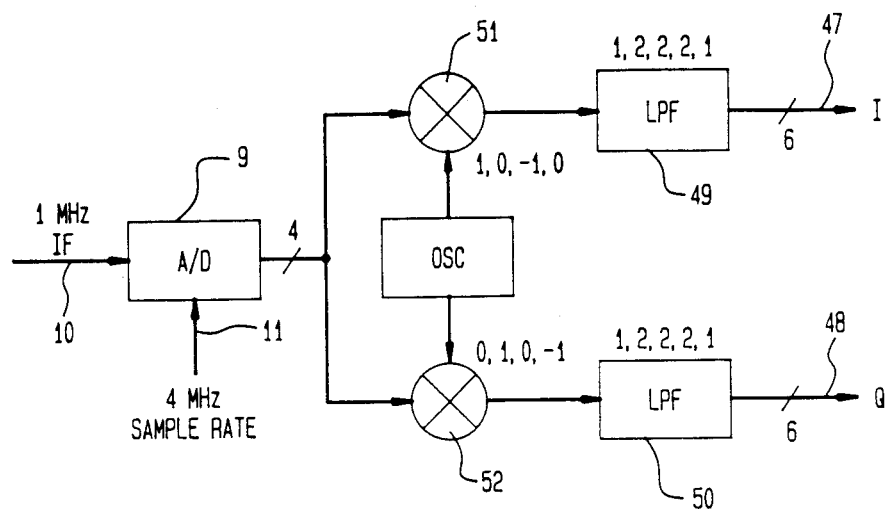
FIG. 2 is a schematic diagram of the front end of the circuitry of the invention of FIG. 1, wherein an IF signal is digitally processed to obtain in-phase and in-quadrature signals.
Figure 2A:
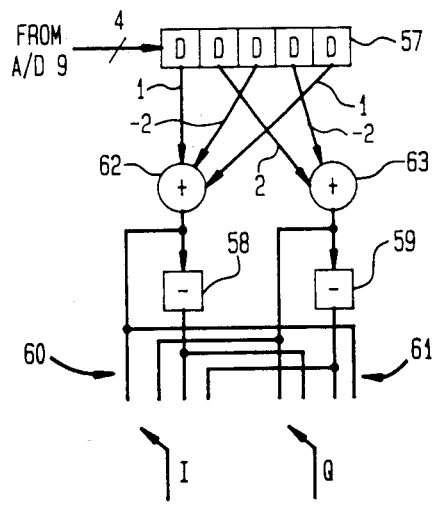
FIG. 2A is a circuit diagram of an alternate embodiment for the circuit shown in FIG. 2.

Referring to FIG. 2A, an alternate and preferred embodiment is shown for the circuit of FIG. 2, described above. The circuit of FIG. 2A utilizes the simple sine and cosine sequences as well as the simple filtering of the previously described circuit. This implementation of the demodulator front end can further be reduced by about a factor of two. Suppose a mixer/filter pair were replaced with just a filter which had changing coefficients to accommodate the effect of the mixer. The filter coefficients would then be (1,0,−2,0,1), (0,−2,0,2,0), (−1,0,2,0,−1) and (0,2,0,−2,0). The sine and cosine filters are the same with a delay of one set of coefficients. Notice that sets 1 and 3 are the same except for the sign of the result. Sets 2 and 4 also have this property. It then follows that this can be reduced to two filters (1,0,−2,0,1) and (0,2,0,2,0) followed by two 2's complement inversions (inverters 58 and 59) and two 4 input MUX's 60 and 61. Since the filters use the same state variables (the samples from the A/D converter 9) only one shift register 57 containing five 4 bit samples is required. Only three adders are required to implement the filters, and two more adders 62 and 63 generate the inverted samples. This arrangement represents a substantial reduction in complexity.

Figure 4:
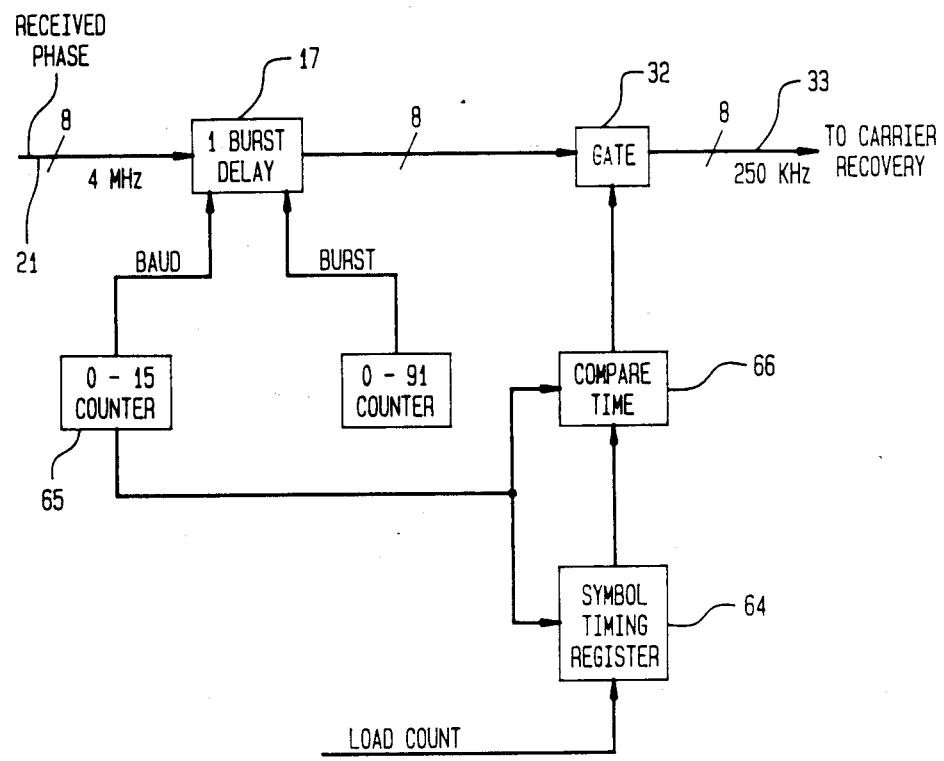
FIG. 4 illustrates a schematic circuit for storing the symbol timing burst for the inventive system of FIG. 1.

Referring to FIG. 4, symbol timing burst memory circuitry is shown. A byte wide RAM 17 is accessed modulo 1472 to store the symbols for each burst. Bursts of length 92 symbols (184 bits) are used. The symbol timing burst memory saves received phase 21 samples at the 4 MHz sampling rate, or 16 times in each symbol. Since 16 samples are saved for each symbol, a total of 1472 bytes is required to save one burst before symbol timing.

A register 64 holds the symbol timing estimate for the present burst. As the baud counter 65 steps through each symbol, the sample time is compared (block 66) with the symbol timing estimate to gate out (block 32) the best sample of 16 for the present burst. After the sample for the present burst is read from the memory 17, the sample for the next burst is written into the same location in a read before write fashion. As the next burst is being saved in RAM 17 and the present burst is gated out of the RAM 17, the symbol timing estimator described in FIG. 5 accumulates data to estimate the symbol timing for the next burst. The symbol timing burst memory thus introduces one burst of delay into the demodulation process to allow symbol timing to be recovered.

This RAM memory 17 of 11,776 bits is the largest single block in the digital demodulator. It represents about one half of the total device area required in a custom IC design of the digital demodulator. The RAM 17 could be implemented as a DRAM to reduce area since every bit is accessed every 400 microseconds. Typical DRAM refresh periods are on the order of 1 millisecond. With differential demodulation, this RAM can be reduced by a factor of four. This can be accomplished by driving a two bit wide RAM with the two MSB's of the differential phase after adding 45 degrees. In this case, the demodulation is performed before the symbol timing, while for coherent demodulation, the demodulation is performed after the symbol timing. So for coherent demodulation, the finely quantized received phase 21 must be saved in the symbol timing RAM 17.

Figure 5:
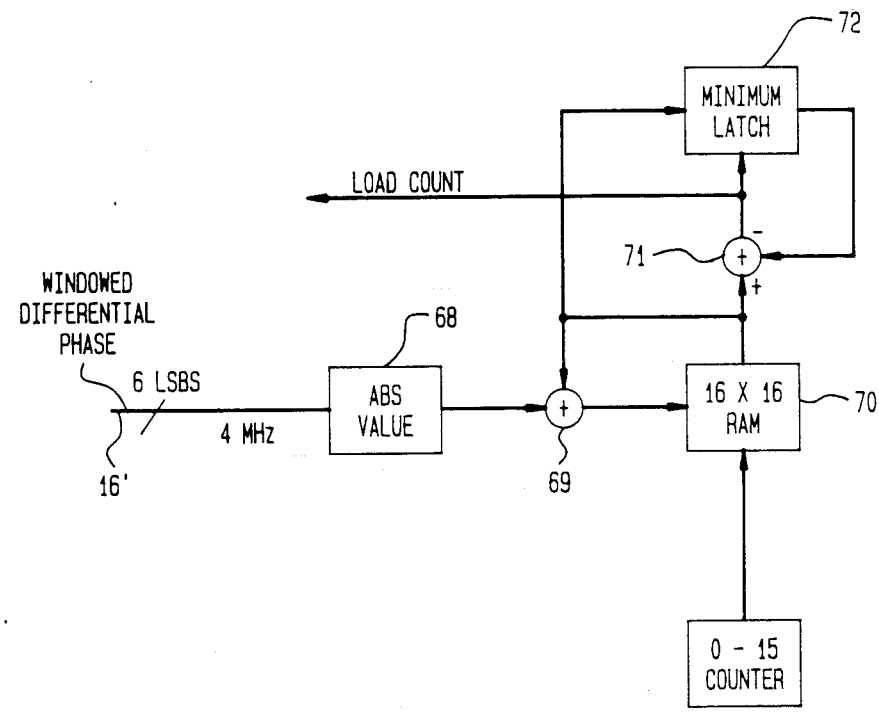
FIG. 5 shows a circuit for estimating symbol timing for the invention depicted in FIG. 1.

Referring to FIG. 5, the circuitry for symbol timing estimation is illustrated. Symbol timing estimation is performed using the middle 64 symbols from each burst. This prevents any noise at the burst edges from disturbing the estimation. A 16 bit adder 69 with sixteen 16 bit accumulators 70 forms the core of the symbol timing estimator. The sixteen accumulators 70 are cleared at the end of each burst to prepare for the next burst. The accumulators 70 are accessed modulo 16 at the same rate, and at each point the absolute value (block 68) of the six LSB's of the 8-bit differential phase 16' are added. The six LSB's of the differential phase 16' essentially maps the phase plane into one quadrant removing the 4-level modulation.

The four expected constellation points, shown in the bottom of FIG. 3A, are all mapped onto the positive x axis (0 degrees). The resultant number should be zero at the sampling point plus any noise and inter-symbol interference. Note, that any frequency offset results in a constant bias in the differential phase which if large can significantly degrade the symbol timing estimation.

By taking the absolute value (block 68) of each sample and accumulating them into different bins for each sample point in a symbol, a sixteen point constellation error function is obtained versus sample points within a symbol that is smallest at the best sample point. The final step in the symbol timing estimator is to determine which bin has the smallest cumulative constellation error. This is performed during the last symbol in each burst using a second 16 bit adder 71 to compare the smallest error found so far with the current error. During the last symbol, the first error is always loaded into the smallest-value register 72 to begin the process. After 16 samples, the smallest value is obtained. A second register, to hold the time (sample number within a symbol) when the smallest symbol error occurs, is clocked along with the smallest-value register 72 and loaded with the current sample time. The frequency offset estimate is also loaded by this signal. The symbol timing register 64 is then used by the symbol timing burst memory to gate out 32 the present burst (FIG. 4).

The frequency offset between the transmitted signal and the receiver is estimated independently for each burst in parallel with the symbol timing estimation. This estimator also uses only the middle 64 symbols of each burst. Between symbol 14 and 78, gate 77 provides the windowed differential phase 16' from the entire differential phase 16. The frequency offset estimate 19 is fed forward into modified first order loops 29 and 30 which integrate the fixed frequency offset estimate along with the phase error signal.

Figure 6:
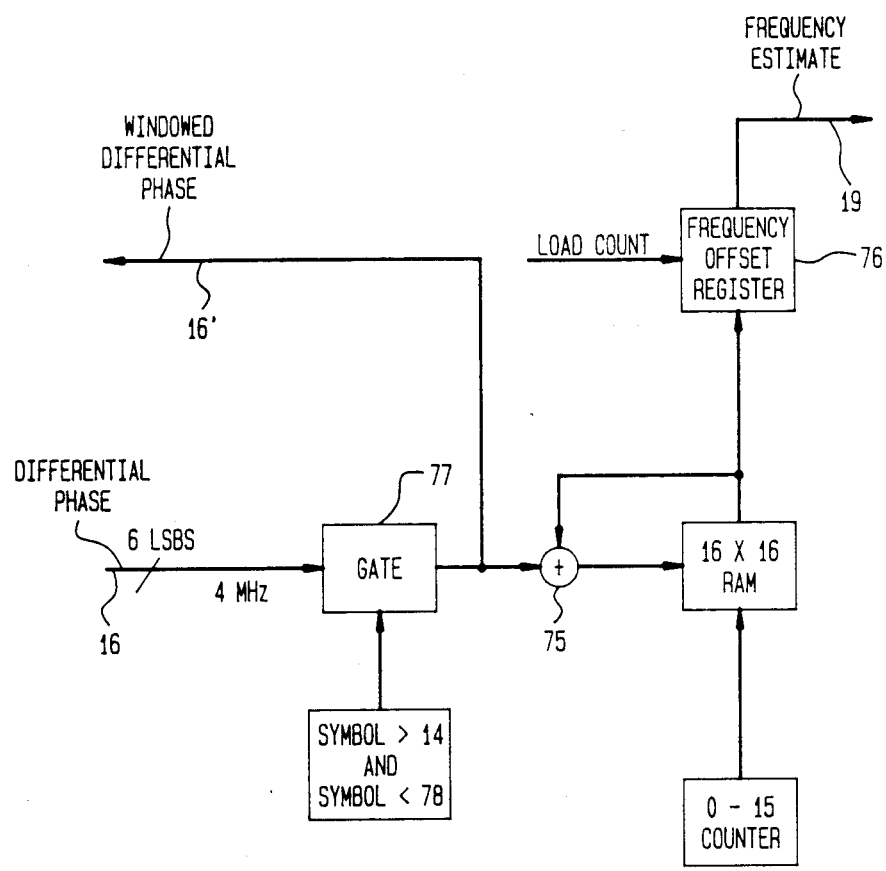
FIG. 6 depicts a circuit for estimating the frequency offset for the system of FIG. 1.

FIG. 6 shows the frequency offset estimator circuit. Sixteen estimates of the frequency offset are made, one for each possible symbol timing point. The symbol timing estimator then gates out the estimate 33 corresponding to the correct symbol timing point. A 16 bit adder 75 accumulates differential phase errors, after modulo mapping into one quadrant, into 16 registers 76 in a modulo addressing fashion at the sampling rate. This architecture is very similar to the symbol timing estimator except that the phase error is accumulated directly instead of taking its absolute value first. The final result is proportional to the frequency offset since any frequency offset results in a constant bias in the differential phase for each symbol.

Figure 7A:
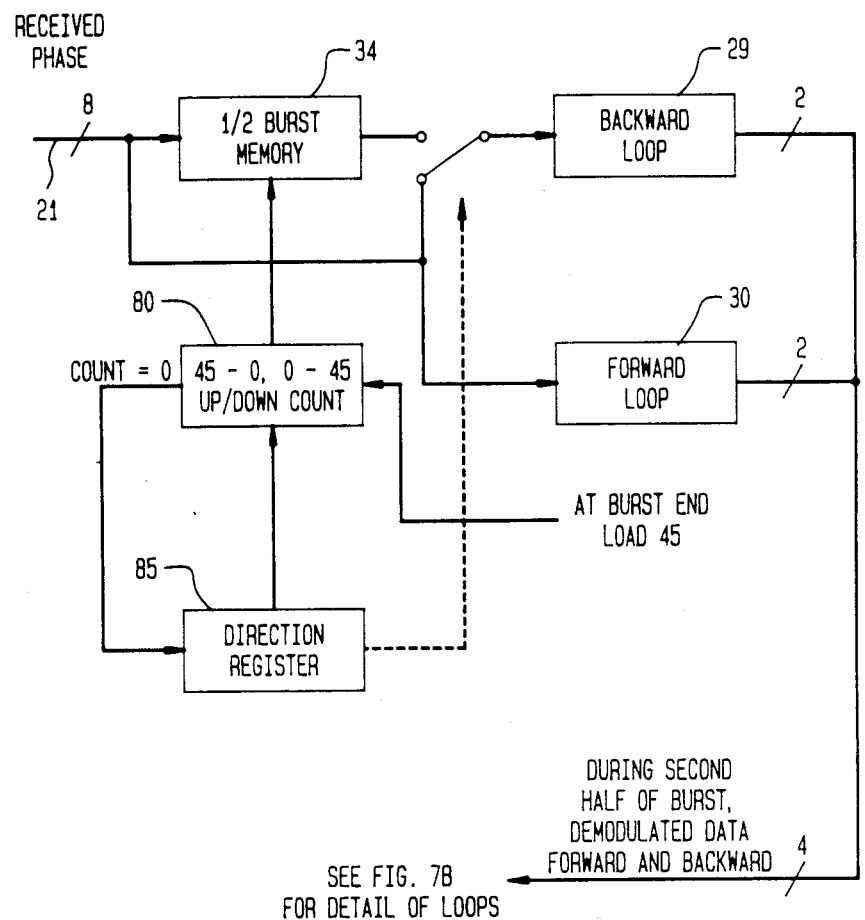
FIG. 7A shows a schematic circuit diagram for the block coherent demodulation process depicted in FIG. 7.

Referring to FIG. 7A, block coherent demodulator circuitry is shown.

Coherent recovery is implemented as modified first order loops 29 and 30 with a gain of 0.25. The first half of each burst at the output of the symbol timing gate is stored in a RAM 34 at the symbol rate while the forward recovery loop 30 captures the carrier's phase 21. The forward loop then continues, but begins saving the demodulated bits in the burst, reordering RAM 44. A second loop, the backward recovery loop 29, starts from the same state as the forward loop 30 at the middle of the burst 39 (FIG. 7) and demodulates data backward in time using the first half of the burst stored in the input RAM 34. Starting the backward loop 20 from the same state as the forward loop 30 is critical in order to prevent phase discontinuities which would cause the differential decode 46 to make errors. The sign of the frequency offset estimate 19 which is integrated along with the phase error is inverted for the backward loop 24 to obtain proper operation.

An up/down counter 80 is used to address the imput RAM 34. Starting with a count equal to half a burst, data is saved in the input RAM 34. When the zero count is reached, the direction of count (register 85) is reversed while data is read from the input RAM 34 for the backward recovery loop 29. The input RAM 34 requires storage for one half a burst of 8 bit phase samples after symbol timing (368 bits).

Figure 7B:
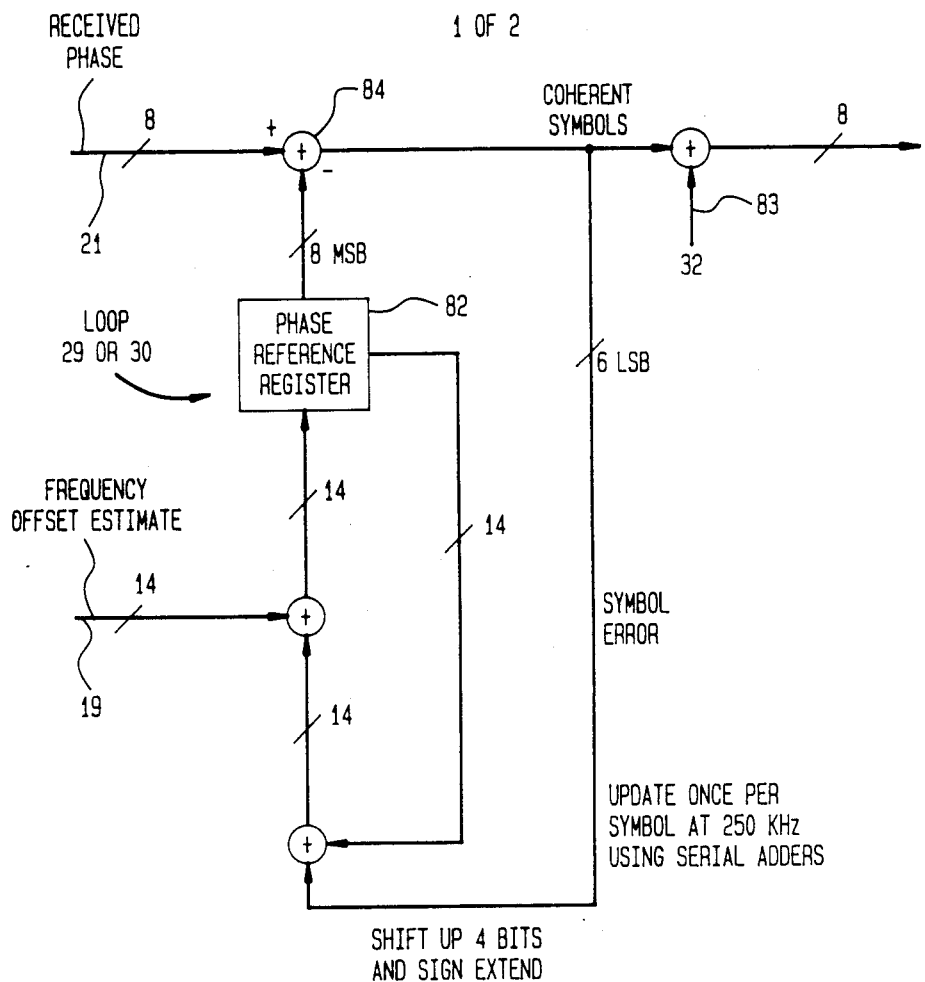
FIG. 7B illustrates the circuitry for one of the two phase lock loops for the circuit shown in FIG. 7A.

FIG. 7B is a diagram of one of the recovery loops. The input RAM 34 and both loops are shown in FIG. 7A. During the second half of each burst, the forward and backward loops store demodulated data in parallel into the reordering RAM 81 (FIG. 8). The carrier recovery loops are implemented using serial arithmetic to reduce the gate count. Four 8 to 14 bit adders are required for each loop, so serial arithmetic reduces the number of adders substantially. Serial arithmetic is possible since the processing rate has been reduced by a factor of 16 to the symbol rate (250 KHz) by the symbol timing circuit. Since the processing clock runs at 16 times the symbol rate, this conveniently allows for 16 bit serial arithmetic. Serial arithmetic uses a single adder and a flip-flop to save the carry in order to process from LSB to MSB at one bit per cycle.

As shown in FIG. 7B, a phase reference register 82 corrects the received symbol phase using an 8 bit serial adder 84. The resulting signal is rotated 45 degrees by adding 33 (arrow 83) to place the phase thresholds properly for demodulation. This allows the data to be recovered by simply taking the two MSB's. The coherent symbols are also fed back to the phase register 82 in a Phase Lock Loop (PLL) configuration. A phase error signal is obtained by stripping the modulation (taking the six LSB's of the coherent symbols) and shifting the signal so that the loop gain is 0.25. Since serial arithmetic is used, shifting up by 4 bits as shown in FIG. 7B is simply a delay of 4 bits. The six LSB's error signal is sign extended to 14 bits by saving the sign bit in a flip-flop (not shown) and using that bit for the last 8 bits of each error signal.

The frequency offset estimate 19 is loaded into a 16 bit parallel load shift register during the last symbol of each burst, and it then circulates there for an entire burst while being used in serial fashion by the coherent loops. The received phase 21 is loaded into an 8 bit parallel load shift register at the symbol rate for use by the forward coherent loop 30. A sample from the first half of each burst of received phase samples, which were stored in RAM, is loaded into a second 8 bit parallel load shift register during the second half of each burst for use by the backward loop 29. A 2 bit shift register with parallel outputs is required at the output of each coherent loop, so that the recovered data can be stored in parallel fashion in the reordering RAM 81 (FIG. 8).

Since the burst are demodulated out of order, they must be reordered before differential decoding could be performed. The reordering RAM 81 is addressed by a second up/down counter 88. This second up/down counter 88 is offset in time from the up/down counter 80 used by the input RAM 34 since one symbol delay occurs in the recovery loops. The reordering RAM 81 processes both the present burst and the next burst at the same time using a read before write operation. During the first half of each burst, only reads occur from the RAM while the counter 88 decrements from 45 to 0, and the top two bits of each 4 bit word are chosen which had been written previously from the backward loop 29. The backward recovery loop had written demodulated data into this RAM 81 in forward order, so the first half of each burst is restored to proper order by reading the reordering RAM 81 backwards.

During the second half of each burst, after the up/down address counter 88 reversed direction, the bottom two bits of each 4 bit word are read which had been written previously from the forward loop 30. During the same address cycle, the demodulated results of the next burst for both loops are written over the present data. The output of the reordering RAM 81 is thus in the original transmission order, and that data drives a differential decoder 46 for 4 phase modulation. The differential decoding together with differential encoding performed at the transmitter resolves the four fold phase ambiguity introduced in the coherent demodulations. The coherent recovery process results in an additional one burst delay in demodulation, so the total delay in the demodulator is two bursts plus several symbols or less than 1 millisecond. The reordering RAM 81 requires storage for one burst of data (184 bits).

EXPERIMENTAL RESULTS

The demodulator is capable of producing results using both differential demodulation and coherent demodulation with differential decoding. Measurements were made against additive white gaussian noise. In addition, sensitivity to frequency offset, signal level presented to the 4 bit A/D converter 9 and DC offset presented to the 4 bit A/D converter were examined.

A simulation of the block coherent demodulator described here shows about 1.5 dB poorer performance against white gaussian noise than does an analytical result based on assuming perfect knowledge of all demodulation parameters and no degradation from filtering or quantization. This loss in performance results from estimating the symbol timing, estimating the frequency offset of the carrier, estimating the carrier phase and quantizing the received signal. The analytical simulation and hardware results are shown in FIG. 9. All results in FIG. 9 are based on bandwidth expansion of 0.5 and differential decoding in addition to coherent demodulation. An additional 0.8 dB of degradation appears in the hardware implementation. This degradation results from imperfections in the analog bandpass filtering and the introduction of noise in analog processing.

Not shown in the figures are the results of some investigation of the sensitivity of the implementation to nonoptimal conditions at the A/D interface. Two concerns in that area are the sensitivity of the demodulator to the signal level presented to the A/D converter, and the sensitivity of the demodulator to any DC offset on the signal at the A/D converter. In the absence of additive noise, the signal level at the A/D converter can be lowered by over 12 dB before irreducible errors begin to occur. At that point, the demodulator is operating with effectively only a 2 bit A/D converter.

If the signal level is set at 12 dB below the optimal level, the performance in the presence of additive noise is significantly degraded. However, the signal level can be varied over a 6 dB range around its optimum point without any significant loss in performance. On the high signal level side, performance begins to degrade soon after clipping begins at the A/D converter. Sensitivity to DC offset is determined by any clipping which results due to the non-centering of the signal in the input range of the A/D converter. As long as no clipping occurs, the demodulator is almost completely insensitive to DC offset on the A/D converter 9. From these results on sensitivity at the A/D interface, a signal level of about −3 dB from clipping is recommended as nominal at the A/D converter. This allows for as much as a 3 dB signal level error, and a DC offset of 5 to 10 percent can be tolerated at the same time. Achieving these tolerances should not be difficult since the received signal is hardlimited in an IF amplifier.

Tests performed to determine sensitivity to carrier frequency offset were consistent with simulation results. They showed that very little degraduation occurs with a 3 KHz offset, but about 0.5 dB degradation occurs at 6 KHz offset. The symbol timing and frequency offset estimators used in this implementation become ineffective between 8 and 10 KHz offset.

Figure 10:
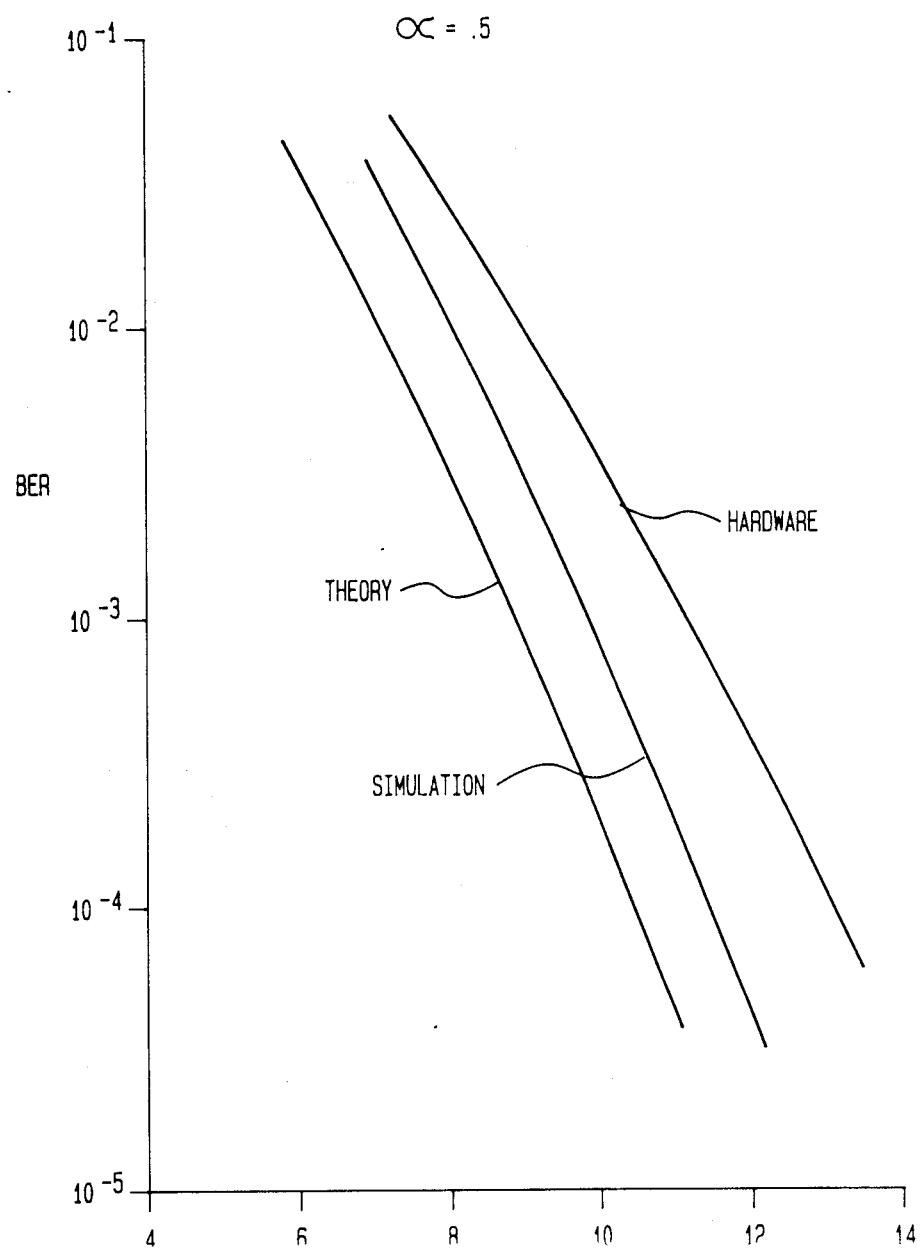
FIG. 10 depicts a graph of performace results for the invention of FIG. 1, as compared to simulated and theoretical results with respect to differential demodulation.

FIG. 10 shows results for differential demodulation. The degradation from the simulation to the hardware is higher for differential demodulation than for coherent demodulation. This is believed to be due to the higher sensitivity of differential demodulation to channel impairments including inter-symbol interference caused by imperfect analog channel filtering. Comparing differential demodulation to coherent demodulation in hardware, a 2.0 dB gain is realized at a BER of $10^{-4}$ verses a 1.5 dB gain realized at a BER of $10^{-3}$. To the extent that imperfections are introduced into the analog signal processing by variability in manufacturing, the performance improvement between coherent and differential demodulation will grow, since differential demodulation will deteriorate more rapidly.

Having thus described the invention, what is desired to be protected by Letters Patent is presented by the subsequently appended claims.

What is claimed is:

1. A method of determining symbol timing in the processing of a digital phase modulated radio signal transmission consisting of sequential bursts of symbols, comprising the steps of:
   (a) converting an IF radio signal from a modulated sinusoid into phase values after sampling said IF radio signal at a rate which is a multiple of the symbol rate by at least a factor of four and at said multiple of sampling times per symbol,
   (b) obtaining differential phase values at each sampling time from said phase values by introducing at least a one symbol delay and taking differences between delayed phase values and corresponding present phase values,
   (c) obtaining symbol timing from said differential phase values by selecting for detection from amongst the set of symbol sampling times the particular sampling time resulting in a minimum average magnitude difference between the differential phase values and a set of expected differential phase values substantially over an entire burst.

2. The method of claim 1, further comprising the step of:
   (d) obtaining a frequency offset estimate by averaging differential phase values less said expected differential phase values per symbol substantially over an entire burst.

3. The method of claim 1, wherein said sampling rate is a factor of sixteen times said symbol rate.

4. The method of claim 3, wherein said symbol rate is in an approximate range of between 100K and 1 Mega baud.

5. The method of claim 1, wherein said radio signal transmission has a bandwidth expansion factor of approximately between 0.10 and 1.0.

6. The method of claim 1, wherein the converted phase values of step (a) are stored while obtaining said symbol timing estimate.

7. The method of claim 6, further comprising the step of demodulating said stored phase values after obtaining said symbol timing.

8. A method for obtaining a symbol timing estimate in the processing of a digital phase modulated radio signal transmission consisting of sequential bursts of symbols, comprising the steps of:
   (a) digitizing an IF signal at a sampling rate which is a multiple of the symbol rate by at least a factor of four and at said multiple of sampling times per symbol;
   (b) processing the digitized signal to obtain in-phase and in-quadrature signals;
   (c) converting said in-phase and in-quadrature signals to phase values at each sampling time;
   (d) obtaining differential phase values from said phase values by introducing at least one symbol delay and taking differences between delayed phase values and corresponding present phase values; and
   (e) obtaining the symbol timing estimate from said differential phase values by selecting from amongst the set of symbol sampling times the sampling time resulting in a minimum average magnitude difference between the differential phase values and a set of expected differential phase values substantially over an entire burst.

9. The method of claim 8, wherein the converting step (c) comprises the step of utilizing said in-phase and in-quadrature signals as addresses for a memory lookup table.

10. The method of claim 8, wherein the sampling rate in step (a) is a factor of sixteen times symbol rate.

11. The method of claim 10, wherein said symbol rate is in an approximate range of between 100K and 1 Mega baud.

12. The method of claim 8, further comprising the steps of:
   (f) obtaining a frequency offset estimate by averaging differential phase values less said expected differential phase values per symbol substantially over an entire burst.

13. The method of claim 8, wherein said radio signal transmission has a bandwidth expansion factor of approximately between 0.10 and 1.0.

14. The method of claim 8, wherein said values of step (c) are stored while obtaining said symbol timing estimate.

15. The method of claim 14, further comprising the step of demodulating said stored phase values after obtaining said symbol timing estimate.

16. A circuit for providing a symbol timing estimate in the processing of digital phase modulated radio signal transmissions consisting of sequential bursts of symbols, comprising:
   means for digitizing an IF signal at a sampling rate which is a multiple of the symbol rate by at least a factor of four;
   means operatively connected to said digitizing means for receiving the digitized signal and providing in-phase and in-quadrature signals;
   a memory operatively connected to the means for providing in-phase and in-quadrature signals for recovery and converting said in-phase and in-quadrature signals to phase values;

delay and differencing means operatively connected to said memory for providing differential phase values from said phase values;

minimum deviation means operatively connected to said delay and differencing means for obtaining a minimization deviation from the closest expected differential phase value;

a plurality of accumulators operatively connected to said minimum deviation means for sequentially receiving and accumulating minimum deviations substantially over an entire burst from said minimum deviation means; and comparing means operatively connected to said plurality of accumulators to find the smallest value in order to provide a symbol timing estimate.

17. The circuit of claim 16, wherein said sampling rate is a factor of sixteen times said symbol rate.

18. The circuit of claim 17, wherein said symbol rate is in an approximate range of between 100K and 1 Mega baud.

19. The circuit of claim 16, wherein said memory includes a look-up table containing phase values.

20. The circuit of claim 16, wherein said delay and differencing means introduces a one symbol delay and takes a difference.

21. The circuit of claim 16, wherein said radio signals have a bandwidth expansion factor of approximately between 0.10 and 1.0.

* * * * *

UNITED STATES PATENT AND TRADEMARK OFFICE
CERTIFICATE OF CORRECTION

PATENT NO. : 4,849,991

DATED : July 18, 1989

INVENTOR(S) : Hamilton W. Arnold and Nelson R. Sollenberger

It is certified that error appears in the above-identified patent and that said Letters Patent is hereby corrected as shown below:

Column 1, line 22, "TCMA" should read --TDMA--.
Column 4, line 31, "in", second occurrence, should read --to--.
Column 8, line 67, "imput" should read --input--.
Column 9, line 26, "33" should read --32--.
Column 11, line 11, "degraduation" should read --degradation--.

Signed and Sealed this

Nineteenth Day of November, 1991

Attest:

HARRY F. MANBECK, JR.

*Attesting Officer*  *Commissioner of Patents and Trademarks*